United States Patent
Chan

(10) Patent No.: US 10,869,040 B2
(45) Date of Patent: Dec. 15, 2020

(54) PERCEPTUAL MULTIMEDIA ENCODING SYSTEM AND METHOD WITH PRE-DEFINED ENCODING QUALITY PATTERNS

(71) Applicant: Chun-Wei Chan, Bellevue, WA (US)

(72) Inventor: Chun-Wei Chan, Bellevue, WA (US)

(*) Notice: Subject to any disclaimer, the term of this patent is extended or adjusted under 35 U.S.C. 154(b) by 161 days.

(21) Appl. No.: 16/152,899

(22) Filed: Oct. 5, 2018

(65) Prior Publication Data

US 2019/0132595 A1 May 2, 2019

Related U.S. Application Data

(60) Provisional application No. 62/578,472, filed on Oct. 29, 2017.

(51) Int. Cl.
| | |
|---|---|
| G06K 9/36 | (2006.01) |
| H04N 19/154 | (2014.01) |
| H04N 19/80 | (2014.01) |
| H04N 19/184 | (2014.01) |
| H04N 19/124 | (2014.01) |
| H04N 19/167 | (2014.01) |
| H04N 19/174 | (2014.01) |

(52) U.S. Cl.
CPC ......... *H04N 19/154* (2014.11); *H04N 19/124* (2014.11); *H04N 19/167* (2014.11); *H04N 19/174* (2014.11); *H04N 19/184* (2014.11); *H04N 19/80* (2014.11)

(58) Field of Classification Search
CPC .. H04N 19/154; H04N 19/167; H04N 19/174; H04N 19/80; H04N 19/184; H04N 19/124
See application file for complete search history.

(56) References Cited

U.S. PATENT DOCUMENTS

| | | | |
|---|---|---|---|
| 2013/0094775 A1* | 4/2013 | Pomianowski | H04N 19/46 382/233 |
| 2014/0321764 A1* | 10/2014 | Zarom | H04N 19/593 382/243 |
| 2016/0165257 A1* | 6/2016 | Chen | H04N 19/172 375/240.12 |

* cited by examiner

*Primary Examiner* — Amara Abdi

(57) ABSTRACT

An image and video compression method includes defining one or more encoding quality patterns, the one or more encoding quality patterns each have pre-determined areas of quality adjustment, the pre-determined areas of quality adjustment including one or more pre-defined regions of lower quality adjustment and one or more pre-defined regions of higher quality adjustment; receiving a frame associated with content to be encoded; selecting one of the one or more encoding quality patterns; processing the frame via an encoder, the processing using the selected one of the one or more encoded quality patterns; and producing a final output of an encoded bit.

6 Claims, 5 Drawing Sheets

303

304

US 10,869,040 B2

PERCEPTUAL MULTIMEDIA ENCODING SYSTEM AND METHOD WITH PRE-DEFINED ENCODING QUALITY PATTERNS

BACKGROUND

1. Field of the Invention

The present invention relates generally to video and image frame encoding systems, and more specifically, to an image and video frame encoding system that utilizes pre-defined encoding quality patterns to improve compression ratio and performance while maintaining the same perceptual quality as conventional methods.

2. Description of Related Art

Image and video frame encoding systems are well known in the art and are effective means to allow video and image signals to be transmitted with reduced bandwidth and stored in less memory. While watching videos, people usually focus on certain areas on the screen. Also, in some systems, video players may overlap a video frame with UI components or logo in border area. Therefore, it is not necessary to encode each sub-region with the same quality settings. Conventional challenges include the desire for a high resolution and high quality image, while still maintaining the reduced bandwidth and file size.

Region of interest based encoding is a commonly used process and system. Region based interest usually means certain objects are interesting to users in the image which is content dependent encoding. For example, FIG. 1 depicts a flowchart 101 of a conventional encoding system, wherein region of interest processing is used to alter a portion of a frame, as opposed to altering the entire frame for quality. During use, an image or video frame is received 103, and the user can either use a content analyzer or not. If a content analyzer isn't used, then the user manually defines ROI and background area 107. If content analyzer is used, then the content is analyzed and records the ROI 105. The user then continues to encode using adjusted QPs for ROI and background areas 109, resulting in output encoded bits 111.

One of the problems commonly associated with conventional ROI encoding processes, is the time consuming and tedious process of defining regions of interest, as there is no pre-defined pattern used. Further, ROIs defined by one system aren't necessary interesting to every viewer. Some viewers might prefer object1 over object2. Also, most ROI encoding tries to define background and objects while in my invention, there is no boundary. Every block's quality encoding factors are defined in my pre-defined pattern.

Accordingly, although great strides have been made in the area of image and video encoding methods, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
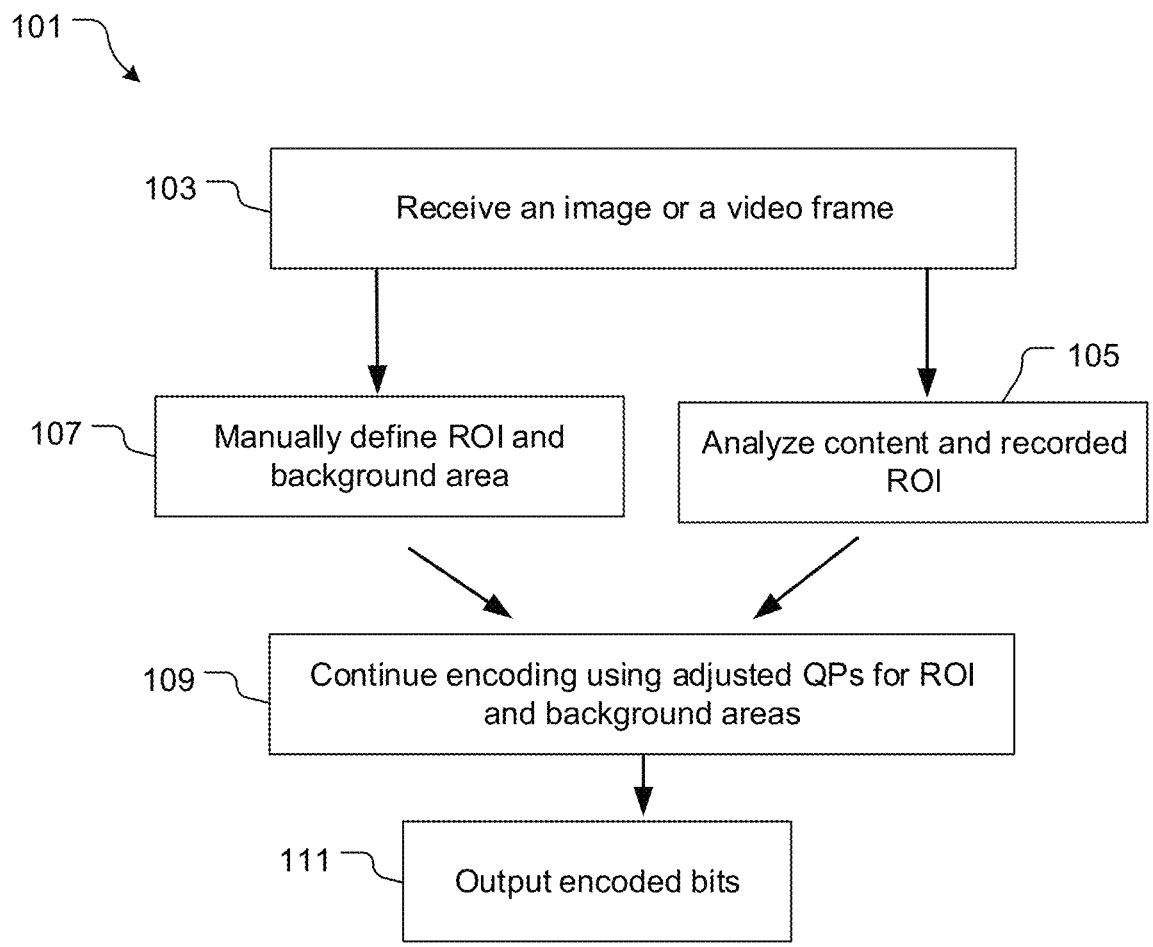
FIG. 1 is a flowchart of a conventional ROI encoding processes.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional ROI encoding systems. Specifically, the present invention provides for the use of pre-defined encoding quality patterns to improve compression ratio and performance while maintaining the same perceptual quality of conventional encoding systems and methods. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
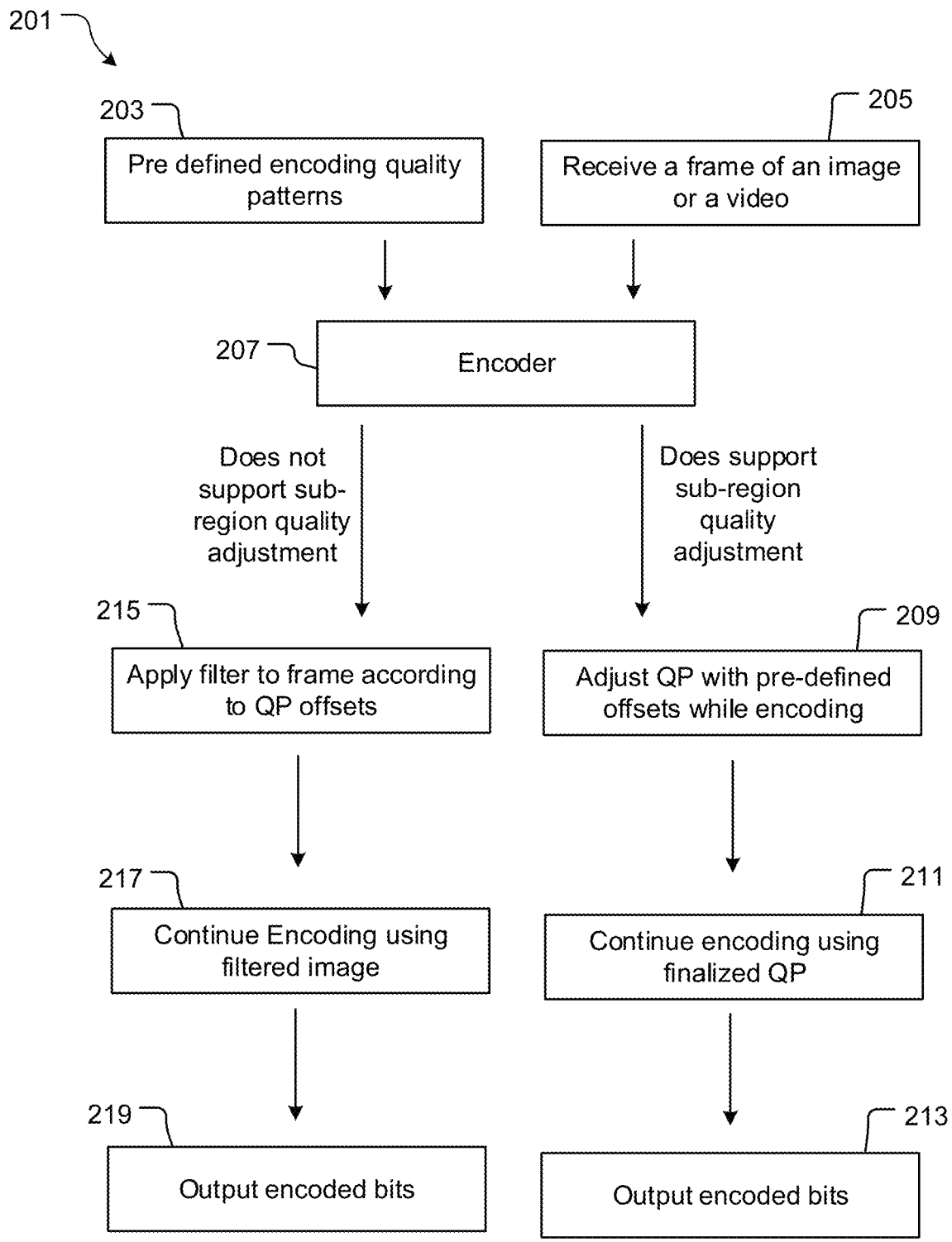
FIG. 2 is a flowchart of an image and video compression method in accordance with an embodiment of the present application.

Referring now to the drawings wherein like reference characters identify corresponding or similar elements throughout the several views, FIG. 2 depicts a flowchart of an image and video compression method 201 in accordance with a preferred embodiment of the present application. It will be appreciated that method 201 overcomes one or more of the above-listed problems commonly associated with conventional video and image encoding systems.

In the contemplated embodiment, method 201 includes first the defining of one or more encoding quality patterns 203. As shown in FIGS. 3A-3D, a plurality of patterns 301, 302, 303, 304 can be established. Each pattern can include a plurality of pre-determined areas of quality adjustment 305, wherein some of the pre-determined areas are low quality adjustment areas 307, and some of the pre-determined areas are high quality adjustment areas 309. Additional areas 311 can be established with a mid-quality.

It should be appreciated that one of the unique features believed characteristic of the present application is the defining of one or more encoding quality patterns for use during the encoding process. With pre-defined encoding quality pattern for reducing bits allocated in defined areas, compression ratio gains an average 20% and higher and also processes faster.

Referring back to FIG. 2, after the one or more encoding quality patterns are established, one is selected and a frame 205 of a content (video and/or images) is received by an encoder 207. In some embodiments, an encoder that supports sub-region quality adjustment is used. In these embodiments, final quantization parameter (QP), for a sub-region (the areas of high, low, mid quality discussed above), will be adjusted based on the selected encoding quality pattern 209. For example, the lower quality areas 307 (represented by dark squares in FIGS. 3A-3D) will have a higher QP positive offset so that those areas are encoded with lower bits than is normally needed. After QP is finalized, the normal encoding process 211 is used to produce the final output bit stream 213. It should be appreciated that this process is efficient, thereby providing for encoding that results in compression ratio gains. It should be appreciated that QP is not the only way to adjust quality and any additional means, known or developed, could be used.

In some embodiments, the encoder 207 does not support sub-region quality adjustment. In these embodiments, a filter 215 will be applied to the frame to reduce the amount of information in the low-quality adjustment areas (represented by darkened squares) defined in the input patterns. This filtered frame is then processed by the encoder in order to produce output encoded bits, as shown in 217, 219.

Figure 3A:
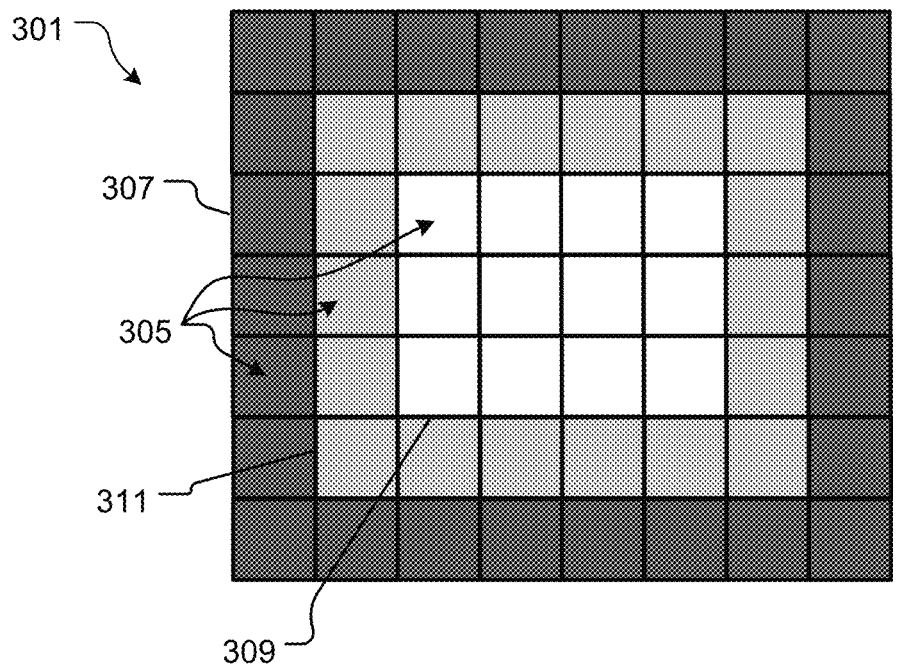
FIGS. 3A-3F are simplified views of a plurality of pre-defined patterns for use with the method of FIG. 2.
Figure 3B:
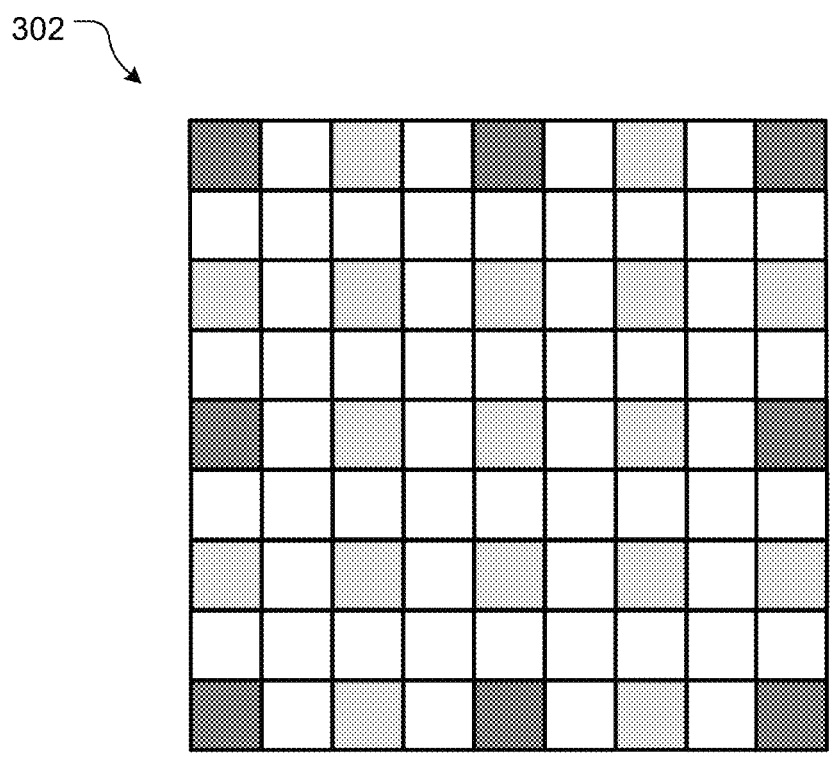
Figure 3C:
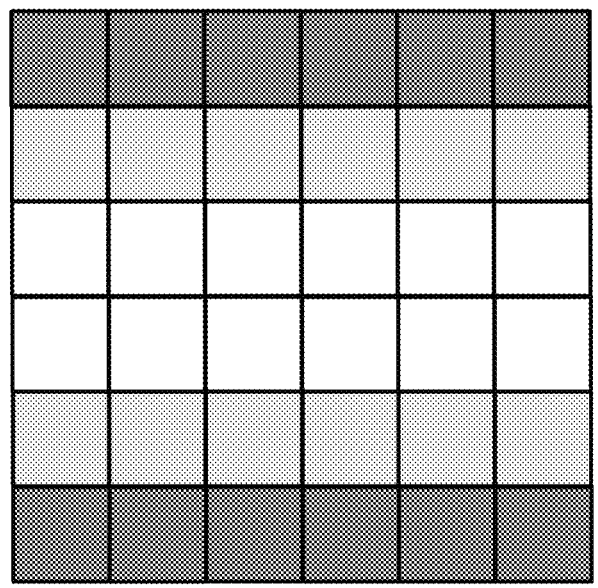
Figure 3D:
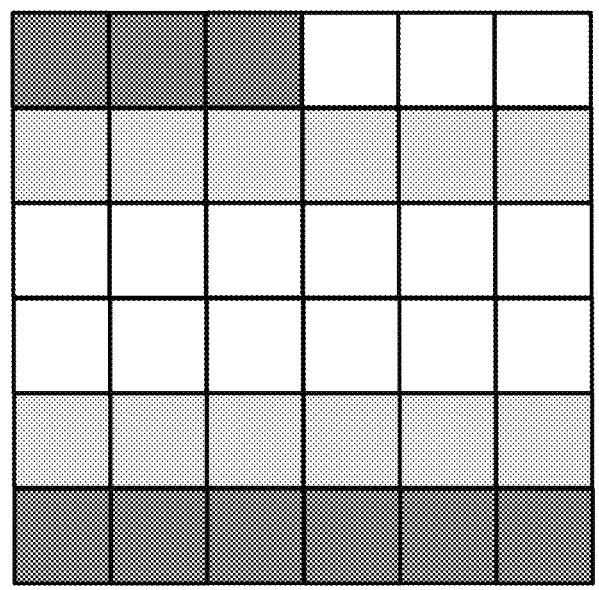
Figure 3E:
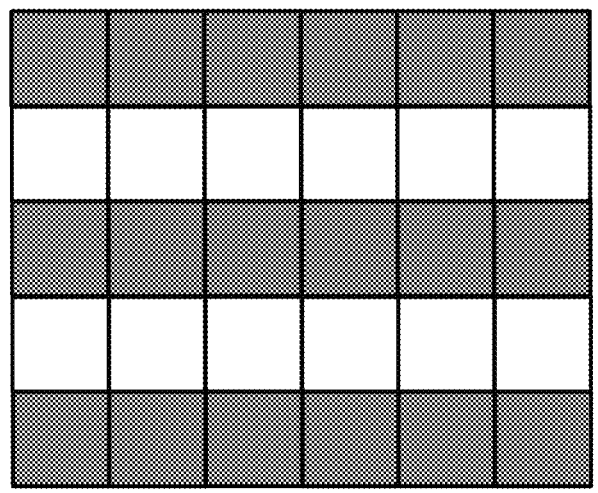
Figure 3F:
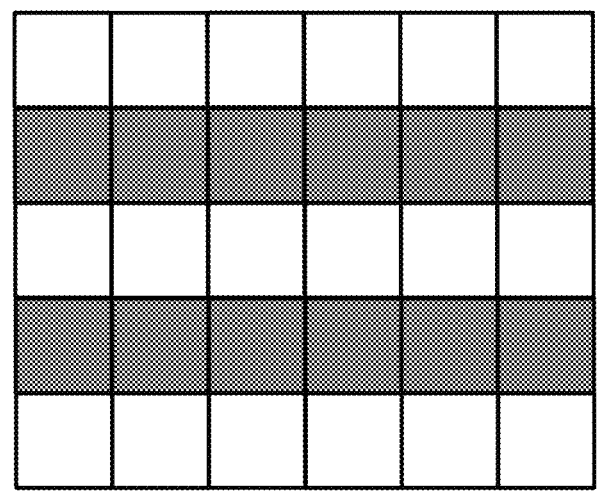

In FIGS. 3A-3F, examples of the patterns discussed above are shown. In FIG. 3A, the pattern 301 represents a pattern appropriate for use to produce a lower quality boarder of the frame, as can be desirable when the main elements and desired elements of the frame are primarily centralized. In FIG. 3B, the pattern 302 shows an interleaved pattern, wherein most sub regions have the same quality as the original image frame, and therefore, viewers won't perceive any quality loss overall. In FIG. 3C, pattern 303 shows a pattern that can be used when a mobile app/other computing device overlaps a video with UIs (which would be positioned under the dark areas of the pattern). This pattern is useful to keep the content under the UI components with low quality as they will not be perceived or viewed by the viewer. In FIG. 3D, pattern 304 shows a pattern wherein the frame contains logos or text, which can be encoded at a higher or lower quality as desired without affecting the viewer's perception. In FIGS. 3E and 3F patterns 305 and 306 show examples of pre-defined patterns with time domain information. Pattern 305 is applied to odd frames, and pattern 306 is applied to even frames.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An image and video compression method, comprising:
defining one or more encoding quality patterns, the one or more encoding quality patterns each have a plurality of pre-determined areas of quality adjustment, the plurality of pre-determined areas of quality adjustment including one or more pre-defined regions of lower quality adjustment and one or more pre-defined regions of higher quality adjustment;
receiving a frame associated with content to be encoded;
selecting one of the one or more encoding quality patterns;
processing the frame via an encoder, the processing using the selected one of the one or more encoded quality patterns; and
producing a final output of an encoded bit;
wherein the encoder is configured to not support sub region quality adjustment.

2. The method of claim 1, wherein the encoder is a sub-region quality adjustment encoder.

3. The method of claim 2, further comprising:
adjusting a final quantization parameter by the selected one of the one or more encoding quality patterns;
wherein the adjustment includes the one or more pre-defined regions of lower quality adjustment of the selected one of the one or more encoding quality patterns resulting in areas of the frame having a higher quantization parameter positive offset, the areas of the frame being encoded with lower bits than other areas of the frame.

4. The method of claim 1, wherein the content is an image.
5. The method of claim 1, wherein the content is a video.
6. The method of claim 1, further comprising:
applying a filter to the frame to reduce information read by the encoder in the one or more pre-defined regions of lower quality adjustment; and
feeding the frame with the applied filter to the encoder for processing.

* * * * *